United States Patent
Johannsen et al.

(10) Patent No.: US 11,059,734 B2
(45) Date of Patent: Jul. 13, 2021

(54) METHOD FOR BIOMASS ASSISTED SEPARATION OF PARTICULATE MATTER FROM A LIQUID STREAM AND UPGRADING OF THE COMBINED SOLIDS

(71) Applicant: IBJ TECHNOLOGY IVS, Aarhus C (DK)

(72) Inventors: Ib Johannsen, Risskov (DK); Patrick Biller, Aarhus V (DK); Lars Ditlev Mørck Ottosen, AArhus N (DK)

(73) Assignee: IBJ Technology Aps, Aarhus (DK)

( * ) Notice: Subject to any disclaimer, the term of this patent is extended or adjusted under 35 U.S.C. 154(b) by 0 days.

(21) Appl. No.: 16/625,065

(22) PCT Filed: Jun. 28, 2018

(86) PCT No.: PCT/DK2018/050168
§ 371 (c)(1),
(2) Date: Dec. 20, 2019

(87) PCT Pub. No.: WO2019/001673
PCT Pub. Date: Jan. 3, 2019

(65) Prior Publication Data
US 2020/0223727 A1    Jul. 16, 2020

(30) Foreign Application Priority Data

Jun. 29, 2017 (EP) .................................. 17178679

(51) Int. Cl.
*C02F 3/32*       (2006.01)
*C02F 103/00*   (2006.01)
(Continued)

(52) U.S. Cl.
CPC ........ *C02F 3/327* (2013.01); *C02F 2103/001* (2013.01); *C02F 2103/002* (2013.01);
(Continued)

(58) Field of Classification Search
CPC ................ C02F 3/327; C02F 2103/001; C02F 2103/002; C02F 2103/10; C02F 2103/32;
(Continued)

(56) References Cited

U.S. PATENT DOCUMENTS 4,285,821 A * 8/1981 Hiesinger ............. C07C 255/00
                                                              210/777
5,188,740 A    2/1993 Khan
(Continued)

FOREIGN PATENT DOCUMENTS

FR           2920759 A1 *  3/2009
WO    WO2012167789 A1    12/2012

OTHER PUBLICATIONS

Machine-generated English translation of FR 2920759, generated on Oct. 9, 2020.*
(Continued)

*Primary Examiner* — Fred Prince
(74) *Attorney, Agent, or Firm* — Casad + Associates

(57) ABSTRACT

The present invention relates to a method of wastewater treatment in which a filter aid prepared by extrusion of freshly harvested wet lignocellulosic feedstocks or by extrusion of wet lignocellulosic feedstocks having dry matter content 30-75% (w/w) is used to collect sewage sludge and the combined spent filter aid with collected sewage sludge is used for hydrothermal conversion.

16 Claims, 6 Drawing Sheets

(51) Int. Cl.
  *C02F 103/10* (2006.01)
  *C02F 103/32* (2006.01)
  *C02F 103/34* (2006.01)
  *C02F 103/22* (2006.01)
(52) U.S. Cl.
  CPC ...... *C02F 2103/10* (2013.01); *C02F 2103/22* (2013.01); *C02F 2103/32* (2013.01); *C02F 2103/327* (2013.01); *C02F 2103/34* (2013.01); *C02F 2303/04* (2013.01)
(58) Field of Classification Search
  CPC .. C02F 2103/34; C02F 2303/04; C02F 11/14; C02F 2103/00; C02F 2303/10; C02F 1/001; Y02W 10/30
  USPC .................................. 210/602, 777, 500.29
  See application file for complete search history.

(56) References Cited

U.S. PATENT DOCUMENTS

| | | | |
|---|---|---|---|
| 2012/0012451 A1* | 1/2012 | Lin | ........................ C10B 49/22 201/3 |
| 2018/0141843 A1* | 5/2018 | Huang | ................... C02F 3/101 |
| 2019/0263700 A1 | 8/2019 | Xu et al. | |

OTHER PUBLICATIONS

Biller, P. et al. "Primary sewage sludge filtration using biomass filter aids and subsequent hydrothermal liquefaction," Water Research (2018) 130:58-68.

Serra, R. Written opinion of the international searching authority, dated Sep. 28, 2018.

* cited by examiner

METHOD FOR BIOMASS ASSISTED SEPARATION OF PARTICULATE MATTER FROM A LIQUID STREAM AND UPGRADING OF THE COMBINED SOLIDS

This application is the US national stage entry of PCT application No. PCT/DK2018/050168 filed on Jun. 28, 2018, which claims priority to EP patent application No. 17178679.1 filed on Jun. 29, 2017, the disclosures of each of which is hereby expressly incorporated by reference in entirety.

TECHNICAL FIELD OF THE INVENTION

The present invention relates to methods of wastewater treatment and to methods for separating particulate matter such as sewage sludge from a liquid stream utilizing a filter medium of modified biomass to promote the filtration process which in turn allows use of the combined particulate matter and filter medium (spent filter aid) in a subsequent thermochemical conversion process.

BACKGROUND OF THE INVENTION

Filtration is a key unit operation in a vast number of processes around the world, and it shows high efficiency provided that the particulate matter to be separated has a reasonable particle size and rigidity. However in many cases this is not the case, the particles are either very fine or are soft. This is especially the case when aqueous media containing particulate matter or biological origin, such as algae suspensions, bacteria, waste water, sludge, manure as well as many side-streams from food production. In such conditions, filtration often turns out to be slow, energy and equipment intensive and quite inefficient, resulting in filter cakes with high water content, and in turn high costs for drying the filter cakes. One solution to this is the use of so-called filter aids, particulate matter with good flow properties that are either admixed to the medium to be filtered or used to make a preliminary filter layer on to the filter. This solution is however adding significantly to the cost, and it increases the amount of material needed to handled together with particulate matter after filtration.

One such application is wastewater treatment, which is a highly energy intensive process, usually performed by anaerobic bacteria that break down many organic pollutants to produce methane which can be recuperated for energy production. This traditional technology has several drawbacks; firstly, the process is slow, which results in large plant sizes to deal with the high influx of wastewater. Secondly, the bacteria are not able to clean water completely so that additional cleaning steps need to be performed, which can be costly, and energy intensive.

Very recently, work on hydrothermal liquefaction (HTL) has seen great promise for the treatment and energy production from wastewater. This process can completely remove organic pollutants from wastewater in minutes, resulting in much lower area requirements for wastewater treatment plants (WWTPs). The high pressure and temperature are able to destroy many pollutants, which are very difficult to treat with conventional techniques such as estrogens, antibiotic compounds and organic toxins. The HTL technology essentially mimics the crude oil formation pathway, which took place on earth for millions of years resulting in our current fossil fuel reserves. In the same manner, the HTL process produces a fossil crude equivalent, which can be refined to renewable fuel products.

One factor identified as a bottleneck and hurdle in the technology's development is the separation of water from solid organic material prior to processing via HTL (Marrone, P. and J. Moeller, Genifuel hydrothermal processing bench-scale technology evaluation project. Water Environment & Reuse Foundation, 2016). Obtaining a slurry with higher solids loading, greatly increases the energy efficiency of the process. Wastewater sludges are notoriously difficult to dewater beyond 10% dry matter content and has posed a challenge in WWTPs for decades.

This example is just one of many uses where the cost of filtration is high, where the particulate matter retains a large amount of water and where classical filter aids cannot be used due to cost and disposal issues.

Hence, an improved process for preparing and/or providing a feedstock for a thermo-chemical conversion plant would be advantageous, and in particular a more efficient and/or reliable process for the production of bio-oil and/or biocrude would be advantageous.

Surprisingly, we have discovered that biomass filter aids prepared by extrusion of lignocellulosic feedstocks in comparatively wet condition, having dry matter content 30-75% (w/w), show greatly improved performance compared with filter aids prepared from milled feedstocks. Even more surprisingly, when biomass filter aids prepared by extrusion in comparatively wet condition are applied to collection of sewage sludge, the resulting substrate for hydrothermal liquefaction exhibits positive synergies, such that greater oil yields are obtained than could be obtained from either sewage sludge or extruded biomass separately.

SUMMARY OF THE INVENTION

In some embodiments, the invention provides a method of wastewater treatment comprising the steps of (i) providing a filter aid prepared by extrusion of freshly harvested wet lignocellulosic feedstocks or by extrusion of wet lignocellulosic feedstocks having dry matter content 30-75% (w/w), (ii) using the filter aid to collect sewage sludge from an aqueous wastewater stream, and (iii) using the spent filter aid with collected sewage sludge as a substrate for hydrothermal liquefaction. In some embodiments, no drying step is performed with the spent filter aid with collected sewage sludge prior to its use as a substrate for hydrothermal liquefaction.

In some embodiments, the invention provides a substrate for hydrothermal liquefaction comprising a filter aid prepared by extrusion of freshly harvested wet lignocellulosic feedstocks or by extrusion of wet lignocellulosic feedstock with dry matter content 30-75% (w/w) and sewage sludge filtered from an aqueous wastewater stream using the filter aid. In some embodiments, the invention provides a method of hydrothermal liquefaction of sewage sludge comprising the steps of providing this substrate and subjecting it to hydrothermal liquefaction.

In some embodiments, the invention provides a filter aid prepared by extrusion of freshly harvested wet lignocellulosic feedstocks or wet lignocellulosic feedstocks having dry matter content 30-75% (w/w), use of the filter aid to collect sewage sludge from an aqueous wastewater stream, and use of the filter aid carrier with collected sewage sludge as a substrate for hydrothermal liquefaction.

The present invention relates to a multipurpose process, which solves several technical problems in an efficient multistep process. In a first step aqueous streams are filtered from particulate matters using filter aids. In a second step, the spent filter aids are used as an input energy source (feedstock) in a thermochemical conversion process. The inventing team has realized that biomass filter aids are particular suited in such multistep process. Firstly, biomass filter aids can efficiently filter particulate matter from water streams. Secondly, the spent filter materials (filter cake) are enriched in biomass materials, which has turned out to be excellent input materials in thermo-chemical conversion processes. Thirdly, thermo-chemical conversion processes can handle input material with relatively high water content, thus, expensive drying steps can be avoided.

Thus, an object of the present invention relates to the provision for improved filter aids. In particular, it is an object of the present invention to provide a process that solves the above-mentioned problems of the prior art with handling spent filter having a high water content.

Thus, one aspect of the invention relates to a process comprising:
a) filtering particulate matter from an aqueous stream, using a biomass filter aid, thereby obtaining
a spent biomass filter aid comprising filtered particulate matter from the aqueous stream; and
a filtered aqueous stream; and
b) using the spent filter aid as a feedstock in a thermo-chemical conversion plant, preferably a hydrothermal liquefaction plant.

Such process may be considered to be for preparing and/or providing a feedstock for a thermo-chemical conversion plant, such as for the production of bio-oil and/or biocrude.

Another aspect of the present invention relates to the use of a spent biomass filter aid from an aqueous stream filtering process, as a feedstock in a thermo-chemical conversion plant, preferably a hydrothermal conversion plant.

Yet another aspect of the present invention is to a process for preparing a feedstock for a thermo-chemical conversion plant, the process comprising
a) performing a filtering process of an aqueous stream, where a biomass is used as a filter aid for removing particulate matter from the aqueous stream, thereby obtaining
a spent filter aid comprising filtered particulate matter from the aqueous stream; and
a filtered aqueous stream; and
b) providing the spent filter aid as a feedstock for a thermo-chemical plant, preferably a hydrothermal liquefaction plant.

In an embodiment, the process further comprises a step c) of using the spent filter aid as a feedstock in a thermo-chemical conversion plant, preferably a hydrothermal liquefaction plant.

Still another aspect of the present invention is to provide a process comprising:
providing a spent biomass filter aid, wherein said filter aid has been used as a filter aid for the removal of particulate matter from an aqueous stream; and
using said spent biomass filter aid as a feedstock in a thermo-chemical conversion plant, preferably a hydrothermal liquefaction plant.

Figure 1:
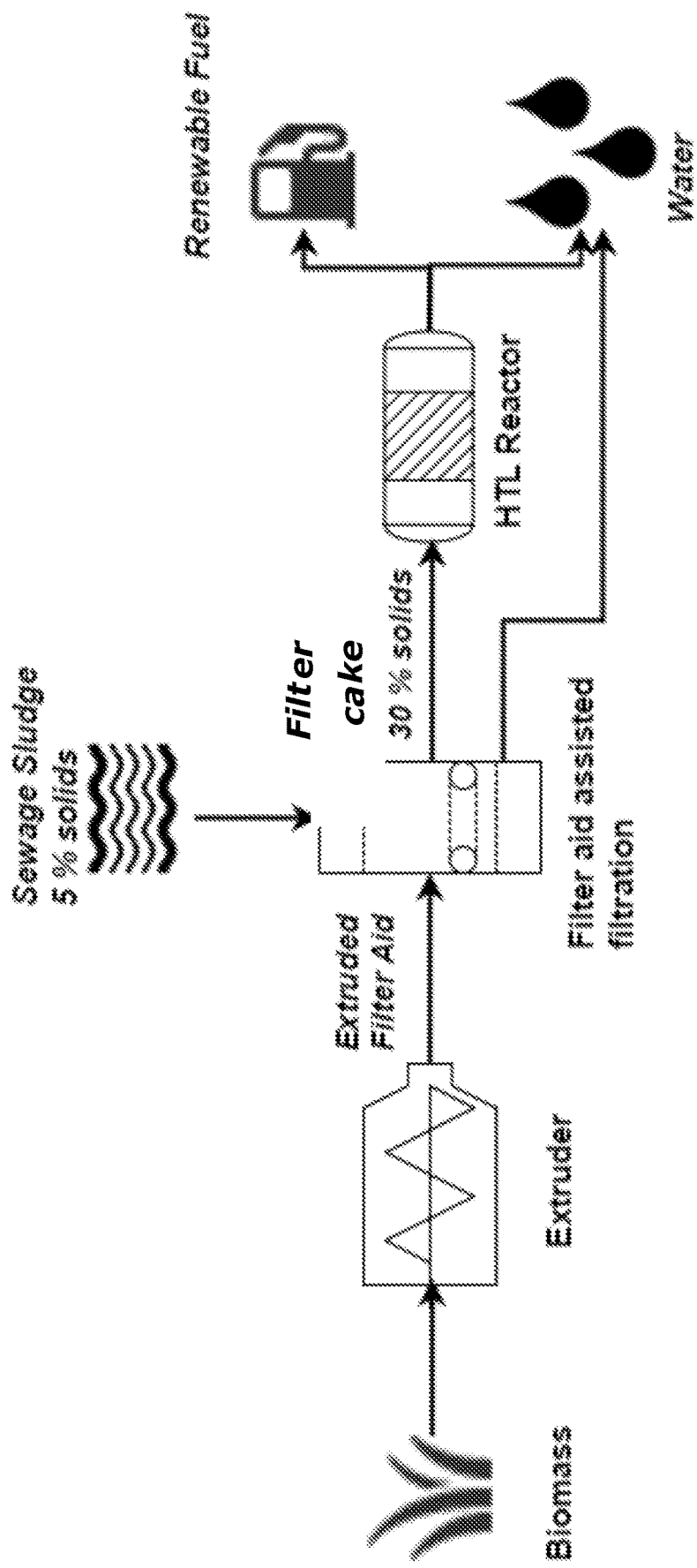
FIG. 1 shows a schematic overview of the WWTP using extruded biomass as filter aid.

The present invention will now be described in more detail in the following.

DETAILED DESCRIPTION OF EMBODIMENTS

Definitions

Prior to discussing the present invention in further details, the following terms and conventions will first be defined:

Filter Aid

In the present context, a "filter aid" refers to a material, which functions as a filter in a filtering process of particulate matter from an aqueous stream. In the present context, the term "spent filter aid" refers to the filter aid after it has been used in a filtering process of particulate matter from an aqueous stream. Thus, a spent filter aid comprises the filter aid itself+filtered particulate matter. Filter aid itself+filtered particulate matter may in the following also be termed "filter cake".

Extrusion of Solid Biomass

Extrusion is a process in which a solid biomass feedstock is subjected to high mechanical shear forces by which the particle size of the material is reduced and the fibrous structure the biomass is exposed. The mechanical shear can be obtained in numerous ways including pushing the material through orifices or tubes, between single or multiple rotating shafts inside a barrel, between co- or counter-rotating discs, between co- or counter-rotating cylinders, given that said shafts, discs or cylinders may be flat or have various geometrical structures built in to improve the shear forces.

Biomass

Within the context of the present invention, it is further to be understood that biomass may include materials and products of biological origin, typically available in large quantities/bulk from living or recently living organisms.

Thermochemical Conversion

In the present context the term "thermochemical conversion" of biomass may, without being bound to any specific theory, be defined as chemical processes performed at elevated temperatures.

Hydrothermal Conversion

In the present context, the term "hydrothermal conversion" or "hydrothermal liquefaction" of biomass may, without being bound to any specific theory, be defined as chemical processes performed at elevated temperatures and pressure in the presence of a liquid phase, such as water or other polar solvents that will convert biomass into lower molecular weight components, such as biofuels (such as crude-like oil, also referred to as bio-oil or biocrude, and other chemical mixtures. An example of a hydrothermal process is described in Biller, P., et al., Effect of hydrothermal liquefaction aqueous phase recycling on bio-crude yields and composition. Bioresour Technol, 2016. 220: p. 190-9).

Any suitable lignocellulosic biomass can be used to practice methods of the invention, notably including but not limited to miscanthus, willow and switchgrass.

In some embodiments, lignocellulosic biomass is used to produce filter aids for practicing methods of the invention by extrusion in wet condition, either as freshly harvested feedstock, feedstock stored in comparatively wet condition, or feedstock to which water is added. In some embodiments, the feedstock used for extrusion has dry matter content between 30-75% w/w. Extruded filter aids are generally suitable for practicing methods of the invention to the extent that they are fluffy in consistenscy, low density (<0.2 kg dry matter (DM) per liter on in gravity driven packing), and having a low incidence of hard particles (<1% w/w) which could interfere with pumping systems used in hydrothermal liquefaction. Methods of extrusion are well known in the art and one skilled in the art will, without undue experimentation, readily arrive at appropriate conditions for achieveing an extruded product suitable for use in methods if the invention. In some embodiments, extrusion is conducted using a twin screw extruder.

Any suitable methods for using filter aids to collect/dewater sewage sludge can be used with biomass filter aids of the invention, including but not limited to any of the methods described by Qi et al. 2011 ("Application of filtration aids for improving sludge de-watering properties—a review," Chemical Engineering Journal 171:373). In some embodiments the method known in the art as "body feed" is used, where filter aid is mixed with the aqueous stream to be treated prior to filtration. In some embodiments, the biomass filter aid is used in an appropriate mass ratio such that, after it has been used to collect sewage sludge, the combined spent filter aid with collected sewage sludge has between 10% and 80% of its solids content provided by the filter aid and between 90% and 20% of its solids content provided by the sewage sludge. In some embodiments, the biomass filter aid is used in a mass ratio of filter aid:sewage sludge within the range 0.1:1 to 1:1.

Practicing methods of the invention produces a substrate for hydrothermal liquefaction comprising (i) a filter aid prepared by extrusion of freshly harvested wet lignocellulosic feedstocks or by extrusion of wet lignocellulosic feedstock with dry matter content 30-75% (w/w) and (ii) sewage sludge filtered from an aqueous wastewater stream using the filter aid. In some embodiments, this substrate has between 10% and 80% of its solids content provided by the filter aid and between 90% and 20% of its solids content provided by the sewage sludge.

Process of filtering an aqueous stream using filter aids and using the spent filter aids in thermo-chemical conversion plant As also mentioned above, an aspect of the invention relates to a process comprising:
  a) filtering particulate matter from an aqueous stream, using biomass as a filter aid, thereby obtaining
    a spent biomass filter aid comprising filtered particulate matter from the aqueous stream; and
    a filtered aqueous stream; and
  b) using the spent filter aid as a feedstock in a thermo-chemical conversion process (or plant), preferably a hydrothermal liquefaction process (or plant).

As described above, the present invention relates to a process with several purposes. Thus, in an embodiment, the process is for preparing and/or providing a feedstock for a thermo-chemical conversion plant, such as for the production of bio-oil and/or biocrude. In yet an embodiment, the process is for removing particulate matter from an aqueous stream and/or recovering energy content from a spent filter aid. In yet an embodiment the process is for preconditioning of a feedstock for a thermo-chemical conversion plant (e.g. HTL). It is to be understood that the term "a feedstock for a thermo-chemical conversion plant" may also be considered to relate to "a feedstock for a thermo-chemical conversion process".

The biomass filter can comprise or consist of different materials. Thus, in an embodiment, the biomass filter aid comprises or consists of lignocellulosic biomass, high cellulose containing material, lignin containing biomass, and other fibrous biomass. In a related and preferred embodiment, said biomass filter aid comprises extruded lignocellulosic plant material. Example 1 shows that extruded plant material is an efficient filter aid.

An advantage of using the spent filter aid in a thermo-chemical conversion process is that such process may handle relatively high water contents. Thus, in an embodiment, the spent filter aid used in the thermo-chemical conversion process (step b), has a dry matter content in the range, 13-50% 13-40% (w/w), such as 13-30%, preferably below 25%. More preferably such as in the range 15-25%, such as 15-22%, such as 15-20%, or such as around 20%. If e.g. a high dry matter of 30-40% is obtained for the thermo-chemical conversion process, part of the water phase remaining after the conversion process may be recycled, thereby improving the process further due to a shift I equilibrium concentrations. If lower dry matter content is used (e.g. 15-25%) the mixture can be used directly in the thermochemical process and partial recycling of water phase—if so desired—could be done to the mixture during filtration. Thus, additional expensive and time-consuming drying steps to lower the water content further may be avoided.

In a preferred embodiment, the spent filter aid used in step b), has a dry matter content equal to or below 25% (w/w), preferably in the range 10-25%, more preferably 15-25%. Thus, in yet an embodiment, no additional drying and/or dewatering steps are performed before the spent filter aid is used in the thermo-chemical conversion process, preferably a hydrothermal liquefaction process. Examples of additional drying or dewatering steps, which may be avoided or reduced in the process according to the invention are heating and/or pressing, since the spent filter aid (filter cake) is readily suitable for the thermo-chemical conversion process.

Another advantage of using the spent filter aid is that the particulate matter from the aqueous stream will also enter into the thermo-chemical conversion process. Thus, in an embodiment the spent filter aid used in the thermo-chemical conversion process (step b), comprises the filter aid and particulate matter from the aqueous wastewater stream. This may also be referred to as the filter cake. In yet an embodiment, the spent filter aid used in the thermo-chemical conversion process (step b) comprises in the range 20-90% (w/w) solids, such as 30-80%, such as 50-80% solids from the aqueous wastewater stream, such as in the range 60-80%, such as 60-75%.

Figure 6:
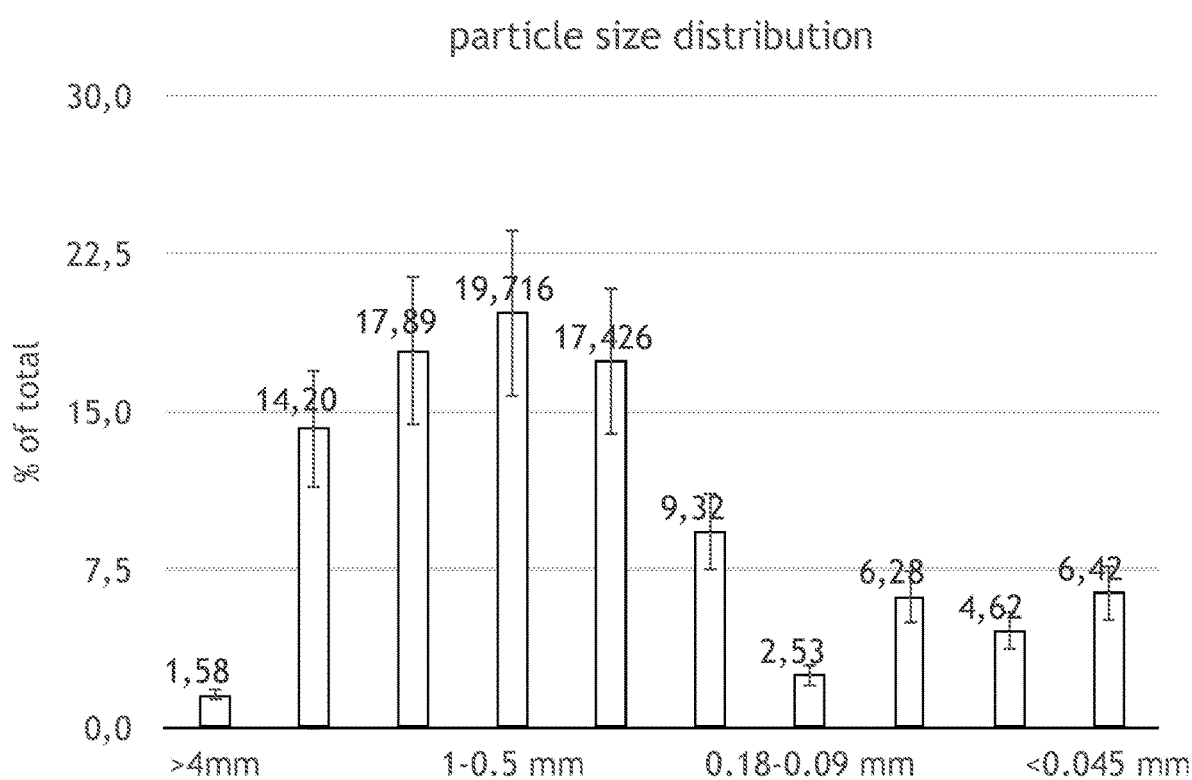
FIG. 6 shows particle size distribution of the extruded miscanthus plant material.

The size of the fibers making up the extruded filter aid can also vary, depending on the exact extrusion process employed. Thus, in an embodiment, at least 30% (w/w) of the extruded lignocellulosic plant material in the filter aid has a particle size (determined by using different mesh sizes) in the range 0.2 mm to 5 mm, such as at least 40%, such as at least 50%, such as at least 60%, or such as at least 70% of the extruded lignocellulosic plant material. FIG. 6 shows size distribution of the tested extruded lignocellulosic material. In a related embodiment, said biomass filter aid comprises fibers having a length to diameter higher than 5 to 1 preferably at least 10 to 1 and more preferably over 50 to 1.

An advantage with the processes according to the present invention is that freshly harvested biomass can be used as filter aid (step a) e.g. with a high water content. Thus, in an embodiment, said biomass filter aid has been prepared from freshly harvested biomass or biomass stored with a dry matter content of 30-75%, such as 30-50%. In a related embodiment, said biomass filter has been harvested within three weeks, such as within 2 weeks, such as within 1 week, such as within 3 days before use as a filter aid, such as within 2 days, or such as within 1 day.

The exact type of lignocellulosic material may of course also vary. Thus, in an embodiment, the biomass filter aid comprises or consists of miscanthus, switchgrass, and/or willow, preferably the biomass filter aid is an extruded lignocellulosic filter aid. In example 2, different types of filter aid materials have been tested.

The filter aids of the invention can be prepared by different methods. Thus, in an embodiment, the biomass filter aid is ground or extruded, preferably extruded, even more preferably extruded plant lignocellulosic material. As also shown in example 2 (+FIG. 4), extruded material performs better than ground material. Without being bound by theory, it is believed that this difference may be due to the extrusion process tearing apart the plant's macromolecular structures and results in a fibrous structure, ideally suited for filtration applications.

In yet an embodiment, the extrusion process is performed in the presence of liquid, preferably water, such as at a dry matter content of 30-90%, such as 30-75%, such as 30-50%. (w/w). Without being bound by theory it is believed that the addition of water assists in preconditioning the biomass before extrusion and thus results in that fibres in the biomass are broken to a lower extent and thus improves the ability of the biomass to withhold particulate matter when used as a filter aid.

In yet an embodiment, an alkali catalyst is added to the spent filter aid (filter cake) before or during use as a feedstock in a thermo-chemical conversion plant (or process), preferably the alkaline catalyst is a carbonate or hydroxide type catalyst (e.g. $K_2CO_3$). In yet an embodiment, the catalyst is added at a concentration of 0.5 to 2% with respect to the water phase. Addition of $K_2CO_3$ as a catalyst is evaluated in example 1. In yet an embodiment, no (external) catalyst (such as $K_2CO_3$) is added to the spent filter aid before or during use as a feedstock in a thermo-chemical conversion plant (or process).

The filter aid can be used as a filter in different ways. Thus, in an embodiment the filter aid is used as a pre-coat filter aid or as a body feed filter aid. In a "body feed" filtering process the filter aid is pre-mixed with the filtrate, whereas in a "pre-coat" filtering process a filter bed material is prepared on existing filtration device. In yet an embodiment, the filter aid is used in a vacuum filtration process, pressure filtration or gravitational filtration process, or such as a belt filter, a disc filter, a cartridge filter, and/or in a filter press.

The aqueous stream to be filtered can have different origins. Thus, in an embodiment, the aqueous stream is selected from the group consisting of wastewater, such as municipal, domestic and/or industrial sewage wastewater, grey water, storm water and industrial wastewaters from breweries, diaries, abattoirs, chemical manufacturing industry, petroleum/gas tracking, mineral processing and mining industry.

Different types of thermo-chemical conversion processes exist. Thus, in an embodiment, the thermo-chemical conversion is selected from the group consisting of hydrothermal carbonization, hydrothermal liquefaction, thermal hydrolysis, combustion, solvothermal liquefaction, hydrothermal gasification, pyrolysis, thermocatalytic reforming (TCR), and Torwash, preferably hydrothermal conversion. In a preferred embodiment, the thermo-chemical conversion process is hydrothermal liquefaction.

Use of a Spent Biomass Filter Aid

In another aspect, the invention relates to the use of a spent biomass filter aid from an aqueous stream filtering process, as a feedstock in a thermo-chemical conversion plant (or process), preferably a hydrothermal conversion plant (or process).

Process for Preparing a Feedstock for a Thermo-Chemical Conversion Plant

A further aspect of the invention relates to a process for preparing a feedstock for a thermo-chemical conversion plant (or a thermo-chemical conversion process), the process comprising
  a) performing a filtering process of an aqueous stream, where a biomass is used as a filter aid for removing particulate matter from the aqueous stream, thereby obtaining
    a spent filter aid comprising filtered particulate matter from the aqueous stream; and
    a filtered aqueous stream; and
  b) providing the spent filter aid as a feedstock for a thermo-chemical conversion plant (or process), preferably a hydrothermal liquefaction plant (or process).

In an embodiment, the process further comprises a step c) of using the spent filter aid as a feedstock in a thermo-chemical conversion plant, preferably a hydrothermal liquefaction plant. It is to be understood that the term "using the spent filter aid as a feedstock in a thermo-chemical conversion plant" may also be considered to relate to "using the spent filter aid as a feedstock in a thermo-chemical conversion process".

In yet an embodiment, said biomass filter aid provided in step a), has a dry matter content in the range 30-75%, such as 30-60%, such as 30-50%, or such as 30-40%.

Process of Using Spent Filter Aids in a Thermo-Chemical Conversion Process

In yet an aspect, the invention relates to a process comprising:
  providing a spent biomass filter aid, wherein said filter aid has been used as a filter aid for the removal of particulate matter from an aqueous stream; and
  using said spent biomass filter aid as a feedstock in a thermo-chemical conversion plant, preferably a hydrothermal liquefaction plant (or process).

As previously mentioned, the invention may serve several purposes. Thus, in an embodiment, the process is for preparing and/or providing a feedstock for a thermo-chemical conversion plant (or process), such as for the production of bio-oil and/or biocrude. In yet an embodiment, the process is for removing particulate matter from an aqueous stream and/or recovering energy content from a spent filter aid. In yet an embodiment the process is for preconditioning of a feedstock for a thermo-chemical conversion plant (or process) (e.g. HTL). In a preferred embodiment, said biomass filter aid is extruded lignocellulosic plant material.

It should be noted that embodiments and features described in the context of one of the aspects of the present invention also apply to the other aspects of the invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. Furthermore, individual features mentioned in different claims, may possibly be advantageously combined, and the mentioning of these features in different claims does not exclude that a combination of features is not possible and advantageous.

All patent and non-patent references cited in the present application, are hereby incorporated by reference in their entirety.

The invention will now be described in further details in the following non-limiting examples.

EXAMPLES

Example 1

Wastewater Treatment

Aim

Wastewater sludges are typically obtained at solids concentrations of 2-6 wt. % after primary settling. Dewatering to higher solids concentrations is desired in many applications as it reduces the transportation cost when less water is transported. If the sludges are used for energy production via hydrothermal liquefaction, it is important to increase the solids concentration as far as possible while still forming a pumpable slurry. Higher solids concentrations achieve higher energy efficiencies as less water is heated in the process in relation to organic material. Ideal dry matter content of sludges for HT are around 15-20 wt %.

Sludges are notoriously difficult to dewater due to the presence of extra cellular polymeric material (EPC). It has been reported to make up 80% of the sludge and includes proteins, polysaccharides, nucleic acids and phospholipids (Skinner, S. J., et al., Quantification of wastewater sludge dewatering. Water Research, 2015. 82: p. 2-13). One way of improving sludge dewatering properties is the use of filter aids (Qi, Y., K. B. Thapa, and A. F. A. Hoadley, *Application of filtration aids for improving sludge dewatering properties—A review*. Chemical Engineering Journal, 2011. 171 (2): p. 373-384). In the current investigation, it is proposed to use extruded biomass as filter aid in the filtering of wastewater sludges. Filter aids act as skeleton builders during filtration operations and aid the filtration process by speeding the up process and obtaining filter cakes (spent filter aids) with higher solids content. The use of filter aids is not a new idea, but up to now, filter aids are often produced from inorganic material such as diatomic earth, zeolites or polymeric material. One issue with these types of filter aids is their high cost. Once the filter aid is clogged, it has to be replaced and, ideally, recovered to be reused. In practice, this is difficult to achieve and hence the application of filter aids has not been successful at large scale.

One of the main advantages of the present technology is that the filter aid can be produced from extruded biomass, and used as a feedstock for a HTL process in combination with the filtrate (sewage sludge). The HTL fuel production step can produce valuable, high quality fuel from both the filter aid and the sewage sludge. Extrusion of biomass is a cheap process, and can utilize cheap and wet $2^{nd}$ generation biomass crops such as Miscanthus, Willow and Switchgrass. The extrusion process tears apart the plant's macromolecular structures and results in a fibrous structure, ideally suited for filtration applications. As the process and feedstock is extremely cheap, the extruded filter aid can be replaced as often as necessary which is the main economic barrier in conventions filter aid materials. A brief overview of an embodiment of the process of the invention is presented in FIG. 1.

Methodology

Primary sludge samples were collected at the Marselisborg WWTP, Aarhus, Denmark operated by Aarhus Vand A/S. Filtration tests were carried out using a 240 mL batch filter press operated at 0.8 MPa. Tests were carried out using standard Fisherbrand filter papers type QL100 or just using a wire mesh (mesh 40). During each experiment, 200 mL of primary sludge with 5 g of filter aid were used. The filter aid method known as body feed was used which entails mixing of the filter aid with the media prior to filtration. Time resolved mass recording were obtained from the filtrate as soon as the filter press pressurization valve was opened. Samples of filtrate and filter aid were collected at the end of the filtration experiments. Samples were dried in an oven at 105° C. for 24 h to obtain the dry matter content of filter cake and filtrate.

Samples of filter cake and primary sludge were processed via hydrothermal liquefaction at 340° C. for 20 min to measure bio-crude yields. The HTL procedures have been published previously (Biller, P., et al., Effect of hydrothermal liquefaction aqueous phase recycling on bio-crude yields and composition. Bioresour Technol, 2016. 220: p. 190-9).

Extruded miscanthus was prepared using an extruder (Xinda, 65 mm twin screw extruder with 200 mm barrel length). Miscanthus was added to the extruder in the presence of a natural content of 30% water. Miscanthus was harvested in the autumn with leaves and chopped to appr 20 mm length before feeding to the extruder. Particle size distribution of the extruded miscanthus material is shown in FIG. 6.

Results

Figure 2:
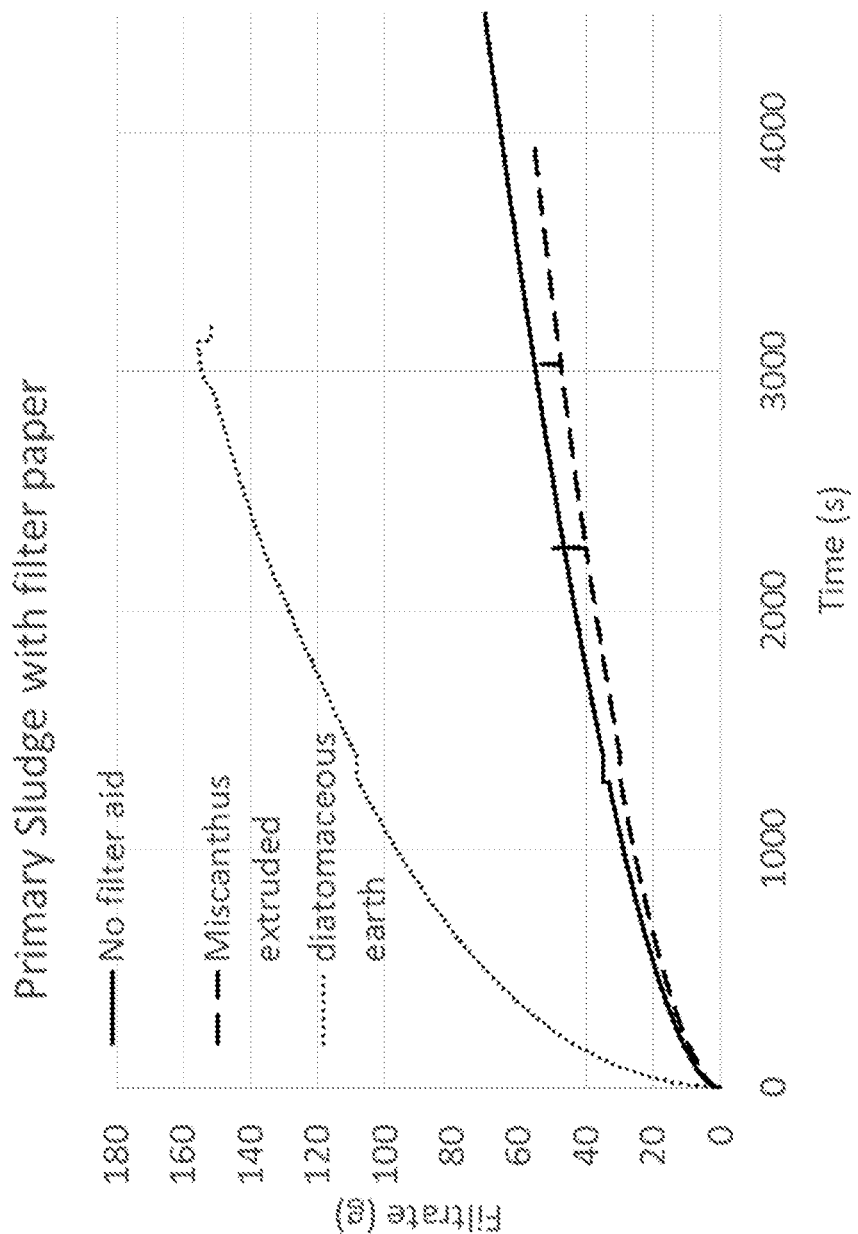
FIG. 2 shows filtration curves of experiments with the use of filter paper.

FIG. 2 shows filtration curves from experiments carried out using primary sludge with 5% dry matter content and the use of standard filter papers (see above) in the filter press. The graph shows that the use of commercial diatomaceous earth filter aid (Sigma Aldrich D K, Kieselguhr, calcined, purified PN: 18514) increases the filtration efficiency dramatically. Almost 160 g of filtrate is obtained after 3000 sec. Without the use of filter and the use of extruded miscanthus as a filter aid only achieve filtrate removal of approximately 60 g after 4000 sec. Thus, the use of extruded miscanthus has no positive effect on the dewaterability of the sludge.

Figure 3:
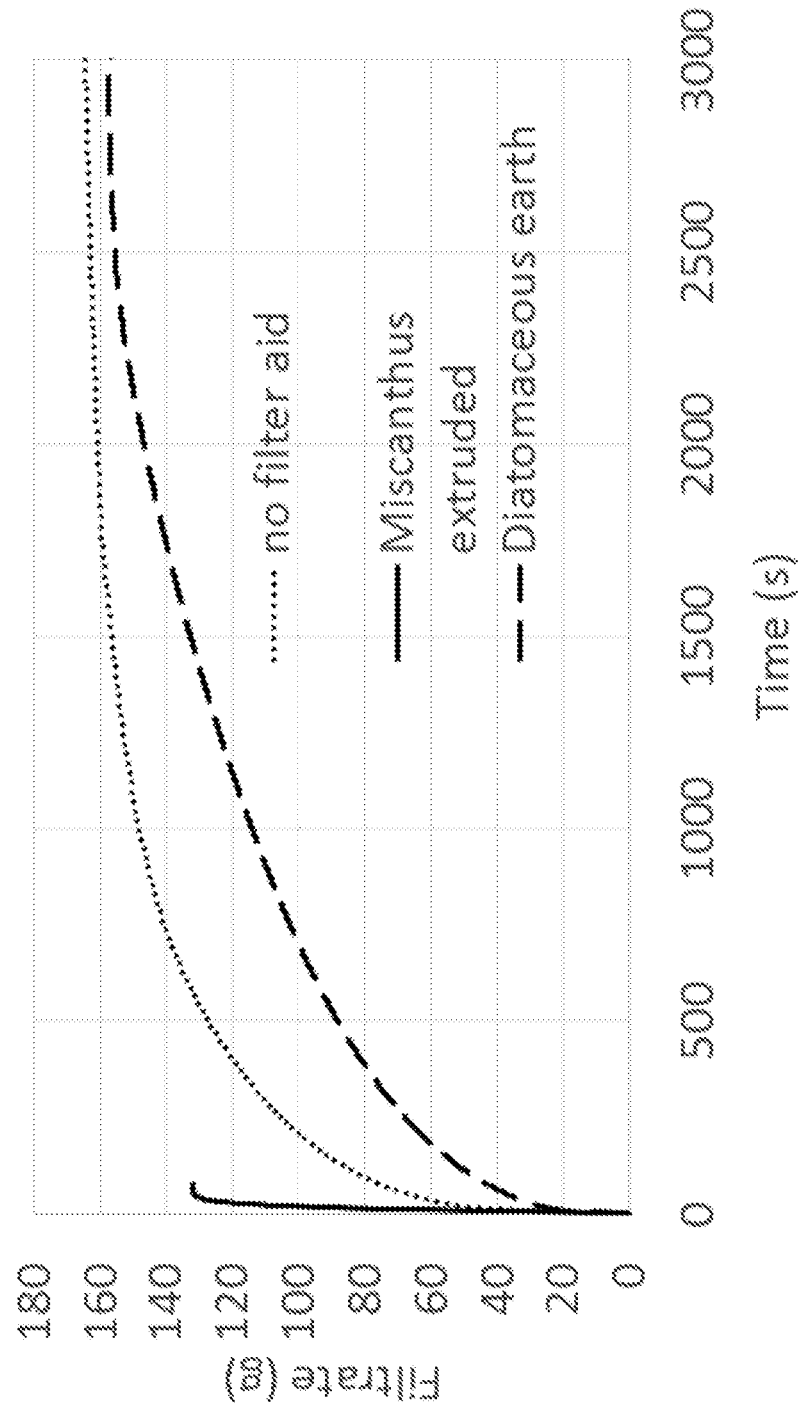
FIG. 3 shows filtration curves of experiments with the use of wire mesh and no filter paper.

FIG. 3 depicts experiments carried out without the use of a filter paper, just using a wire mesh. The use of extruded miscanthus filter aid results in a dramatic improvement of filterability of the primary sludge sample. Constant filtrate mass is obtained after one minute with a total of 132 g filtrate. The total filtrate mass is lower compared to the use of diatomaceous each with filter paper (FIG. 2) due to the water holding capacity of the miscanthus filter aid in addition to the residual water in the sludge. Using no filter aid showed better filtration performance compared to the commercial filter aid in this set of experiments. Using diatomaceous earth resulted in the formation of a solid plug in the filter press, which slowed down the process. Using diatomaceous earth resulted in a higher filtrate mass compared to miscanthus filter aid and a similar final mass to no filter aid.

The final dry matter content measurements of filtrate and filter cake are listed in Table 1X for experiments carried out with the use of the wire mesh. Using diatomaceous earth resulted in the lowest solids content in the filtrate of 0.4%, which translates to a filtration efficiency of 94% based on total solids removed. Slightly reduced filtration efficiency is obtained without the use of filter aid with 91%. Using extruded miscanthus resulted in a final solids concentration in the filtrate of 0.5%, translating to a filtration efficiency of 89%. This shows that the filtration efficiency is negatively impacted using miscanthus, as potentially additional material is washed out of the miscanthus filter material compared to not using any filter aid. The use of diatomaceous earth results in the highest efficiency due to the increased removal of fine particle when the filter aid forms a solid filter plug.

TABLE 1X dry matter content in filtrate and filter cake and filtration efficiency.

| Experiment | Solids in filtrate (wt. %) | Solids in filter cake (wt. %) | Filtration efficiency (%) |
|---|---|---|---|
| Primary Sludge, no filter aid | 0.5 | 34 | 91 |
| Primary Sludge + Miscanthus extruded | 0.8 | 21 | 89 |
| Sludge + diatomaceous earth | 0.4 | NA | 94 |

Raw sludge and sludge combined with miscanthus filter aid with and without the use of filter paper were subjected to HTL. The sludge sample on its own was also processed with a homogeneous alkali catalyst $K_2CO_3$. Sludge without filter aid resulted in a bio-crude yield on an organic basis of 37 and 43% with and without $K_2CO_3$ respectively. The use of catalyst is shown to reduce particularly the gas and solids yields, producing more water-soluble material.

Combined filter cake from sludge and miscanthus resulted in bio-crude yields of 43 and 47% when the wire mesh was used compared to filter paper.

In the experiments with miscanthus approximately ⅓ of the organics going into the HTL reaction are miscanthus while ⅔ are from primary sludge. Primary sludge on its own results in a bio-crude yield of 42.6% and that of miscanthus of 23.8%. In theory a yield of (⅔)×42.6%+(⅓)×23.8%=36.3% should be achieved from the combination of filter aid and sludge. The measured yield however is shown to be higher, in the region of 43-47%. This shows that the combination has a positive synergetic effect on bio-crude formation. A likely reason for this is the breakdown of protein in sludge to $NH_4$, which acts as an alkali agent in the HTL reaction. Alkali catalysts have been shown to increase bio-crude yields from lignocellulosic biomass such as miscanthus (Zhu, Y., et al., Techno-economic analysis of liquid fuel production from woody biomass via hydrothermal liquefaction (HTL) and upgrading. Applied Energy, 2014. 129(0): p. 384-394), which is also shown in Table 2. Alkali catalysts for liquefaction of lignocellulose are a major cost factor in fuel production in HTL.

TABLE 2X

Yields of product fractions from Hydrothermal Liquefaction of primary sludge at different conditions.

| Sample | Condition | Bio-crude (%) | | Gas (%) | Solid (%) | Water (%) |
|---|---|---|---|---|---|---|
| Primary Sludge | Ext. Misc. no filter paper | 47.1 | ±0.4 | 22.9 | 17.6 | 17.6 |
| Primary Sludge | Ext. Misc. Wire mesh | 43.0 | ±1.5 | 18.9 | 15.6 | 27.3 |
| Primary Sludge | no filter aid, no catalyst | 42.6 | ±0.7 | 16.2 | 19.6 | 21.6 |
| Primary Sludge | no filter aid, $K_2CO_3$ catalyst | 37.0 | ±1.5 | 9.7 | 8.9 | 44.4 |
| Miscanthus | no catalyst | 23.8 | ±1.6 | | | |
| Miscanthus | $K_2CO_3$ catalyst | 27.1 | ±1.4 | | | |

Conclusions

Extruded miscanthus as a filter aid in the dewatering of sludge is shown to decrease filtration times of primary sludge from around 25 minutes down to 1 minute. This increase comes at a moderate penalty of filtration efficiency with a decrease from 94 to 89%.

The filter cake material obtained from miscanthus filter aid and sludge has a dry matter content of 21%, ideal for HTL with high-energy efficiency. Compared to HTL of sludge at 5% dry matter an approximately 4 times higher energy efficiency is possible. Water removal to 20% without the presented approach would usually entail a large energy penalty for dewatering or high cost for filter aid material. Subsequent HTL of the combined filter cake results in bio-crude yields exceeding the yields of sludge on its own, showing that significant portions of bio-crude are produced also from the filter aid material.

The value of the filter aid material is therefore twofold: reduced filtration times and additional fuel generation.

Finally, the results indicate that miscanthus does not require an alkali catalyst when co-processed as filter aid with sludge for high bio-crude yields.

Thus, biomass filter aids are interesting alternatives to diatomaceous earth filter aids, since diatomaceous earth filter aids cannot subsequently be used as a feedstock in a thermo-chemical conversion process, since is it is an inorganic material. Organic filter aids on the other hand contribute to bio-crude or bio-energy production in general. Furthermore, diatomaceous earth filter aids are costly, cannot be separated from the organic material easily and contribute to waste production.

Example 2

Aims

Demonstrate the alternative filter aid application known as pre-coat (vs. body feed). This entails making the filter in the filtration device prior to adding the media.

Demonstrate different biomass types as extruded filter aid material.

Demonstrate vacuum filtration over pressure filtration.

Methodology

Vacuum filtration was carried out in a Buchner funnel with a filter paper (as above) of 42.5 mm diameter. 1 or 2.5 g of filter aid was added to the funnel and pre-wetted with 10 mL of distilled water. 50 mL of 5 wt. % yeast solution was used as filtration media. The time was recorded until less than 1 drop of filtrate was observed in 10 sec.

Miscanthus was ground using a knife mill and subsequently sieved to obtain particles that passed a 0.25 mm mesh.

Extruded material was prepared as described in example 1.

Figure 4:
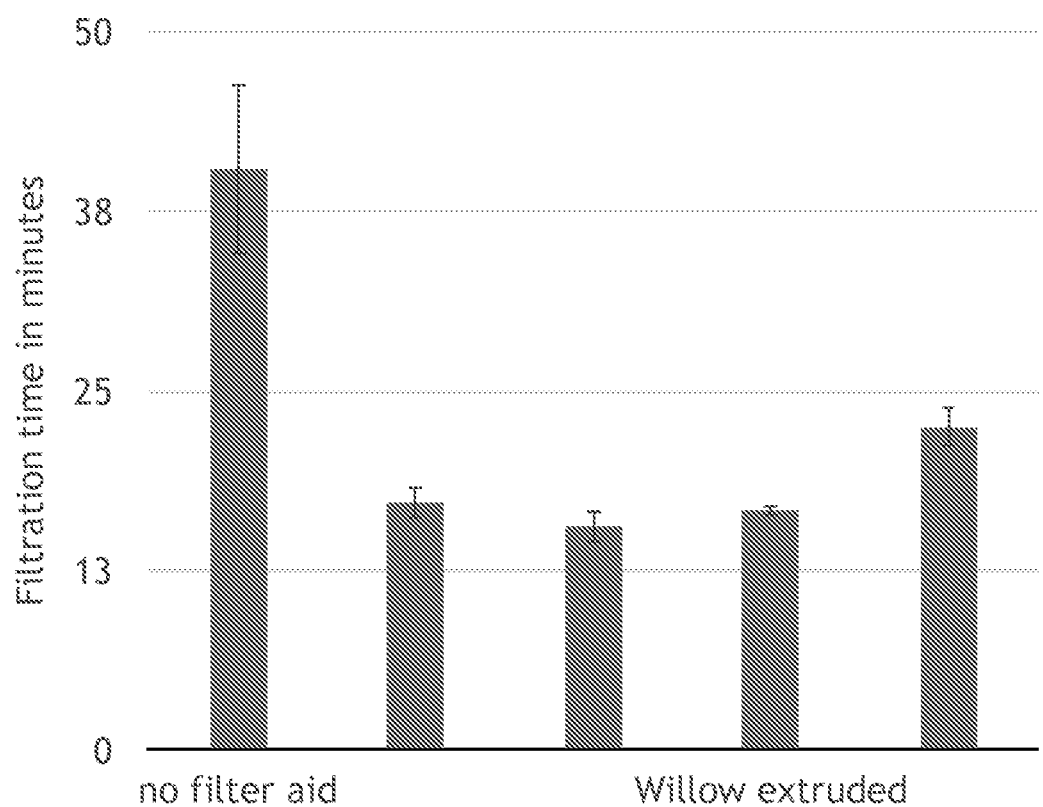
FIG. 4 shows filtration times for different types of filter aids.

Extruded filter aid material from three different biomass types+one ground was examined:
Extruded miscanthus
Extruded switchgrass
Extruded willow
Ground miscanthus
Results and Conclusion
Significant improvements in total filtration time are observed when filter aid material is used (FIG. 4).
All three extruded materials had similar performances and all slightly better than miscanthus, which was ground to particles by conventional size deduction technique (mill). Using 1 or 2.5 g of filter aid had no significant impact on filtration times.

Example 3

Figure 5:
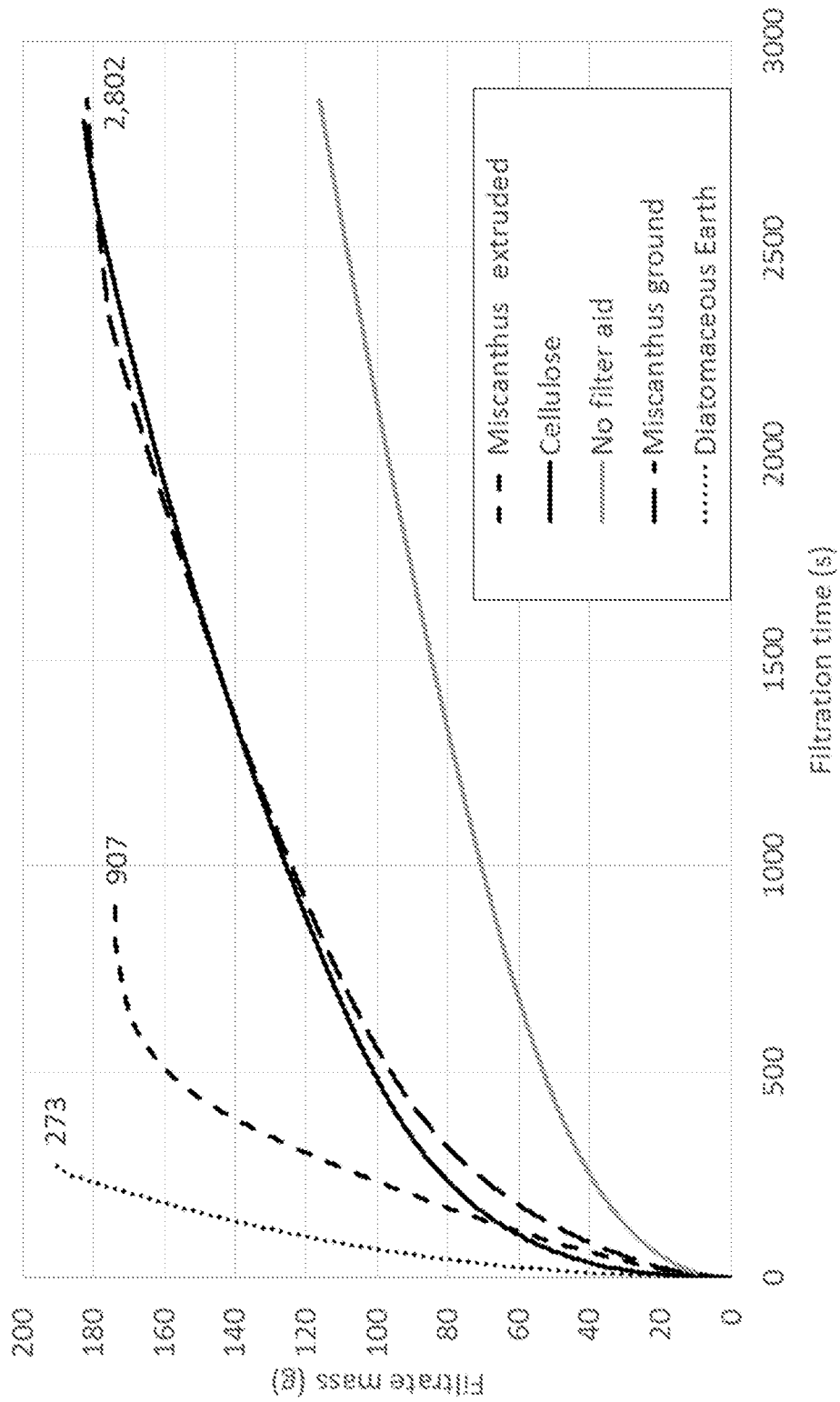
FIG. 5 shows filtration characteristics of extruded miscanthus filter aid, cellulose filter aid, no filter aid, ground miscanthus filter aid, and diatomaceous earth filter aid.

Aims
Demonstrate extrusion vs grinding of biomass for filter aid production
Demonstrate different filter media (yeast)
Demonstrate against additional commercial filter aids (cellulose fibre and diatomaceous earth)
Methodology
Filtration tests were carried out using a 240 mL batch filter press operated at 0.8 MPa. Tests were carried out using standard Whatman filter papers.
During each experiment, 200 mL of filter media with 5 g of filter aid were used. The filter aid method known as body feed was used which entails mixing of the filer aid with the media prior to filtration. Time resolved mass recording were obtained from the filtrate as soon as the filter press pressurization valve was opened.
Samples of filtrate and filter aid were collected at the end of the filtration experiments. Samples were dried in an oven at 105° C. for 24 h to obtain the dry matter content of filter cake and filtrate. The following filter aids were tested:
No filter aid
Extruded miscanthus
Cellulose (Sigma Aldrich D K, CELLULOSE FIBROUS, MEDIUM, PN: C6288)
Ground miscanthus
Diatomaceous Earth (Sigma Aldrich D K, Kieselguhr, calcined, purified PN: 18514)
Results
As shown in FIG. 5, commercial filter aid, diatomaceous earth, exhibited the best filtration characteristics in both speed and final filtrate mass of around 190 g after 273 sec. Extruded miscanthus filter aid achieved a final filtrate mass of 170 g after 850 sec. the water holding capacity of extruded miscanthus most likely is the reason for lower filtrate mass. Commercial cellulose fiber and ground miscanthus performed significantly worse compared to diatomaceous earth and extruded biomass in terms of filtration speed but achieved similar final filtrate mass. Using no filter aid at all resulted in a filtrate mass of only 120 g after 3000 sec.
Conclusions
Extruded biomass shows superior filtration characteristics compared to ground biomass. Extruded biomass filter aid is superior to cellulose fibres but inferior to diatomaceous earth.
On the other hand, (as previously mentioned) diatomaceous earth cannot be used as a feedstock in a thermochemical conversion process due to its inorganic nature. Furthermore, diatomaceous earth filter aids are more expensive.

Example 4

Filter aid materials were produced from willow, miscanthus and switchgrass via extrusion. Extruded biomass was prepared from roughly chopped material (10e50 mm) using an extruder (Xinda, 65 mm twin screw extruder with 2000 mm barrel length). Miscanthus was harvested early autumn with leaves and had a natural content of water of 30%. Willow was harvested as year sprouts in the winter and had a water content of 50%, whereas switchgrass, harvested in early autumn, had a 45% water content.
Additionally miscanthus (only stems) was milled using a knife mill and separated using a vibrating sieve shaker to obtain particles in the size range of 180e250 mm.
Pine flakes as well as hammer milled pine flakes were sourced from a commercial wood shaving supplier, Agroform A/S (Denmark). The six different biomass samples used as filter aid are shown in FIG. 1S (electronic supplementary). Visual inspection of the samples led to following estimations on size and geometry of the samples, where aspect ratio is calculated as the ratio of the particles' diameter to length.
Pine e milled: particles range from 0.2 to 3 mm, mean 2 mm; length to diameter ratio (aspect ratio of 1e5).
Pine Flakes: particles 2e12 mm, mean 5 mm; aspect ratio 6-15. Miscanthus—milled: particles 0.18e0.25 mm; aspect ratio 3-10. Miscanthus extruded: particles 0.1e8 mm; aspect ratio 5-25. Switchgrass extruded: particles 0.1e8 mm; aspect ratio 10-40. Willow extruded: particles 0.1e8 mm; aspect ratio 5-35. Commercial filter aids were purchased from Sigma-Aldrich; Cellulose (Sigma Aldrich D K, CELLULOSE FIBROUS, MEDIUM, PN: C6288) and Kieselguhr (Sigma Aldrich D K, Kieselguhr, calcined, purified PN: 18514).
The filter aid materials were used to conduct filtration experiments as described in example 1.
In order to calculate the effect of filter aid on the specific cake resistance and estimate filtration capacities in a rotary drum filter, following calculations were applied:
The Kozeny-Carman Equation $$\frac{(-\Delta P)_f}{L} = 180 \frac{(1-\varepsilon)^2}{\varepsilon^3} \frac{\mu v_s}{D_p^2}$$

describes the pressure loss in systems involving laminar flow through packed beds, approximating them to a group of capillary tubes and using Darcy's law as the cake resistance term in the equation. This equation can be rearranged to a useful function which relates the rate and the volume of filtrate, as summarized by Foust et al., (1980 Principles of unit operations, John Wiley & Sons, New York, N.Y.). Assuming that the liquid suspension is homogeneous during the experiment, we have:

$$\frac{\partial \theta}{\partial V} = \frac{\mu \alpha w}{A^2(-\Delta P_t)} \cdot (V + V_e)$$

Where:

-continued $\frac{\Delta \theta}{\Delta V}$ = Inverse of rate $\left[\frac{s}{m^3}\right]$;

$\mu$ = viscosity [Pa.s];

$\alpha$ = specific resistance of the cake $\left[\frac{m}{kg}\right]$;

$w$ = weight of the solids in suspension divided by the volume of liquid in this suspension $\left[\frac{kg}{m^3_{water}}\right]$;

$A$ = Filtration area [$m^2$];

$V$ = Variable volume of filtrate [$m^3$];

$V_e$ = Volume equivalent to the resistance of pipes and filter media [$m^3$]

Using the linear relation found in the equation above between $$\frac{\partial \theta}{\partial V}$$

and V it was possible to estimate the specific cake resistance alpha. Once the specific cake resistance is calculated it can be applied to estimate the filtration rate of a continuous rotary drum filtration system as described by (Davis and Caretta, 2010, "Analysis of a continuous rotary drum filtration system," AI Che J. 56(7): 1737) using $$V = \frac{2}{3\alpha w}\left(2\alpha w\left(-\frac{\Delta p}{\mu}\right)^{1/2} f^{3/2} t_c^{1/2} A\right)$$

where w is the combined solids content in the sludge (7.5%; 5% from primary sludge plus filter aid); Dp the differential pressure applied to the filtration system (0.5 bar); f f is the fraction of the time $t_C$ in which a thin slice of filter area stays in contact with the slurry (50%); $t_C$ is the time for one cycle (30 s, at 2 rpm) and A is the filter area (length 2 m, radius 0.67 m, area 8.38 $m^2$).

The final dry matter content measurements of filtrate and filter cake, final filtrate mass and filtration efficiencies are listed in Table 1. Using kieselguhr resulted in the lowest solids content in the filtrate of 0.4% which translates to the highest filtration efficiency of 94% based on total solids removed. Slightly reduced filtration efficiency is obtained without the use of filter aid with 91%. Using miscanthus resulted in a final solids concentration in the filtrate of 0.9%, translating to a filtration efficiency of 87%. This indicates that the filtration efficiency is negatively impacted using miscanthus as additional material such as fine particles, salts and soluble carbohydrates are washed out of the biomass filter material compared to not using any filter aid. Blank filtration tests with only filter aid confirmed this, as e.g. 0.13 g and 0.08 g were washed out from extruded willow and miscanthus respectively. Taking this into account leads to approximately 1% higher filtration efficiencies on average. Samples of filtrate were also dried and combusted in order to determine the ash content of the non-retained solids and was found to be 44 wt % (db). This means that in terms of organic retention in the filter cake the filtration efficiency is slightly higher at 92% on average vs 87% on total solids as reported in Table 1 (which is reprinted from Biller et al. 2018, "Primary sewage sludge filtration using biomass filter aids and subsequent hydrothermal co-lioquefaction," Water Research 130:58, which is hereby expressly incorporated by reference in entirety). This translates to an organic carbon content in the filtrate of 0.2e0.3% vs 2.2% in the original sludge sample. The filter cakes from all extruded biomass assisted filtration tests essentially perform similar in terms of final dry matter content of filter cake ranging from 20.5 to 22.6%. For the use as a slurry in continuous HTL, these DM contents may be slightly too high to pump, typically a DM of 15e20% is desired. The addition of additional water to the filtrate in order to obtain the right DM content is however not a problem, as the addition of water is performed more easily than its removal. The DM of the filter cakes from milled samples (Misc and Pine) are higher than the extruded samples most likely due to a more densely packed filter cake and increased filtration times. Increasing the amount of filter cake relative to sludge resulted in higher levels of total solids in the filtrate and reduced DM filter cakes. The previously identified, optimal ratio of 0.25:1, resulted in a DM content of 24% which would most likely require slight dilution with filtrate in order to obtain a pumpable slurry. If a DM content of 24% was to be obtained by simply adding biomass to the sludge 3.8 g of biomass would be required per g of dry sludge rather than just 0.25 g, i.e. a 15 fold increase in biomass demand.

Secondary sludge filtration using extruded willow led to a higher filtration efficiency compared to primary sludge but in a lower DM content of the filter cake of only 13.1%. At a low secondary to primary sludge ratios of 0.5:1 and high ratios >2.5:1 the DM content of the filter cakes are low in the range of 12e14%, only at the intermediate rations of 0.75 and 1.5:1 is the DM content in a comparable range to those from primary sludge filtration (~19%). In general the secondary sludge filtration and combination experiments exhibit higher filtration efficiencies compared to primary sludge filtration.

TABLE 1 dry matter content in filtrate and filtercake and filtration efficiency.

| | | Solids in filter cake (w) | Filtrate mass (g) | Filtration efficiency (%) |
|---|---|---|---|---|
| | Solids in filtrate (wt) | | | |
| No filter aid | 0.6 | 33.8 | 166.3 | 90.7 |
| Kieselguhr | 0.4 | 31.3 | 156.5 | 93.6 |
| *Miscanthus* milled | 0.9 | 27.7 | 154.6 | 86.8 |
| *Miscanthus* Ext. | 0.9 | 22.0 | 141.2 | 86.6 |
| Switchgrass Ext. | 1.2 | 22.6 | 143.7 | 83.0 |
| Willow Ext. | 1.3 | 20.5 | 139.3 | 82.0 |
| Pine Flakes | 1.0 | 21.8 | 143.3 | 86.2 |
| Pine milled | 1.0 | 29.2 | 154.6 | 84.4 |
| Ext. *Miscanthus* - different ratios Ratio (Filteraid:dry sludge) | | | | |
| 1 g        0.1:1 | 0.7 | 30.7 | 164.4 | 88.7 |
| 2.5 g      0.25:1 | 0.9 | 24.0 | 152.2 | 86.1 |
| 5 g        0.5:1 | 0.9 | 22.0 | 141.2 | 86.5 |
| 7.5 g      0.75:1 | 1.0 | 16.2 | 105.0 | 89.5 |
| 10 g       1:1 | 1.0 | 14.2 | 78.5 | 92.5 |
| Ext Willow sludge ratios Ratio (Sec:Prim Sludge) | | | | |
| 0.5:1 | 0.5 | 13.9 | 140.1 | 94.2 |
| 0.75:1 | 0.8 | 19.1 | 137.1 | 90.8 |
| 1:0 | 0.4 | 13.2 | 149.8 | 95.6 |
| 1.5:1 | 0.7 | 18.9 | 146.7 | 90.2 |
| 2.5:1 | 0.5 | 14.1 | 142.9 | 89.3 |
| 3.5:1 | 0.5 | 12.5 | 138.9 | 89.5 |

Example 5

The filter aid materials, and samples described in Example 4 including samples of biomass filter aid, filter cake and primary sludge were processed via hydrothermal liquefaction in 20 mL batch reactors at 340 C for 20 min, the procedure has been published previously (Biller et al., 2016b, "Effect of hydrothermal liquefaction aqueous phase recycling on bio-crude yields and composition," Bioresource Technol. 220:190). Briefly, the HTL procedure consisted of loading the sample slurry into the batch reactors, sealing them and submerging them into a preheated fluidized sand bath. After 20 min total reaction time in the sand bath, the reactors were quickly removed and quenched in a water bath. After cleaning the outside of the reactors from sand and water, they were weighed, carefully vented and weighed again to determine the mass of gas produced. The water phase was then decanted into a centrifuge tube and the reactor rinsed with 3 aliquots (~3 mL each) of dichloromethane (DCM) and recovered in a separate centrifuge tube. The tube with the aqueous phase was spun in a centrifuge and the supernatant recovered using a pipette in a separate tube. The remaining contents from the two tubes were recovered using DCM and vacuum filtered through a pre-weighed filter paper and rinsed with DCM until clear. The filter paper was dried and reweighed to determine the mass of solid residue produced. The DCM phase was dried under a stream of nitrogen and the remaining bio-crude mass determined gravimetrically. The yields of aqueous soluble product was determined by difference from the three measured fractions (gas, solids and bio-crude). Biomass, biocrude and HTL solid residue samples were analyzed for elemental content using an Elementar vario Macro Cube elemental analyser (Langenselbold, Germany). Water phase samples were analysed for total organic carbon (TOC) and total nitrogen (TN) content using Hach-Lange cuvette tests (LCK 387, LCK338).

Samples of biomass used for filter aid production and raw sewage sludge were subjected to HTL either in water or in the presence of homogenous alkali catalyst at 2 wt % loading of total slurry. This was firstly carried out to investigate the yields and bio-crude properties of the individual components used for biomass assisted sludge filtration. Secondly, the effect of catalyst was investigated to shed light on the co-liquefaction of filter cake of lignocellulosic biomass without the use of catalyst. The yields of bio-crude on an organic basis (dry ash free ¼ daf) and the dry basis mass balances to the four fractions bio-crude, gas, solids and process water are presented for all HTL experiments in Table 2 (which is reprinted from Biller et al. 2018, "Primary sewage sludge filtration using biomass filter aids and subsequent hydrothermal co-lioquefaction," Water Research 130:58, which is incorporated by reference in entirety).

Primary sludge HTL resulted in a bio-crude yield of 37.0 and 42.6 wt % (daf) respectively in the presence and absence of $K_2CO_3$. PNNL researchers report a biocrude yield of 37% on a dry basis without the use of alkali, comparable to the result observed in the current study (35.4% db) (Marrone and Moeller, 2016). The use of alkali in HTL of primary sludge resulted in lower yields of gas and bio-crude with an increase in process water yield. Generally the use of alkali is employed to minimize the char production but this is not observed in sludge liquefaction. In the liquefaction of the lignocellulosic biomass samples this is however evident with significant reduction for miscanthus, willow and pine. Surprisingly switchgrass does not show this trend. Bio-crude yields of biomass samples are not necessarily higher with the use of alkali, willow and miscanthus are, while switchgrass and pine are lower. We reported similar observations previously in the liquefaction of 15 types of natural vegetation and agricultural crops, where the addition of alkali sometimes increased and sometimes decreased bio-crude yields (Biller et al., 2017, "Assessment of agricultural crops and natural vegetation in Scotland for energy production by anaerobic digestion and hydrothermal liquefaction," Biomass Conyers. Biorefinery 7(4):467).

The combined filter cake from filtration experiments were processed at the DM contents obtained after filtration ranging from 21 to 29 wt % while the individual components were all liquefied at 10 wt % loadings. It is important to state this, as solids loadings have been reported to affect bio-crude yields both positively and negatively. Generally, in batch systems (as employed in the current study) increased solids loadings do not have large effects on bio-crude yields. However on continuous systems, higher DM slurries have been reported to increase the carbon recovery to bio-crude and the bio-crude yields. On continuous systems higher solids loadings also increase the energy efficiency as less water is heated per unit of bio-crude produced and reduces all equipment and associated capital costs, as well as operating costs.

The bio-crude yields for combined sewage-biomass filter cakes range from 41 to 47% on an organic basis which represents a considerable increase compared to the biomass samples and a slight increase compared to sewage sludge. The gas yield in co-liquefaction ranges averages at 21%, higher than the average for non-catalytic liquefaction of individual components (14.5%) and lower compared to catalyzed HTL (24%). As the co-liquefaction was carried out without catalyst and the gas yields from sludge were low (16.2%), it stands to reason that the co-liquefaction of sludge and biomass has similar effects as adding a catalyst in terms of increased gas production and decarboxylation (as the majority of gas produced in HTL is $CO_2$). The yield of water soluble products is low with an average of 22% compared to 40% in non-combined liquefaction for both catalytic and non-catalytic HTL. This could represent a positive side effect in addition to the high biocrude yields as it reduces the amounts of product in the water which has to be treated in a WWTP context.

The theoretical bio-crude yields were calculated on basis of linear averaging the results from single feedstocks. In the experiments with biomass filter aid and sludge, approximately ⅓ of the feedstock going into the HTL reaction is biomass while ⅔ are primary sludge. Primary sludge on its own resulted in a bio-crude yield of 42.6% and that of e.g. miscanthus 22.8%. In theory a yield of (⅔) 42.6% p (⅓) 22.8% ¼ 36.0% should be achieved from the combination of filter aid and sludge. The measured yield however is shown to be higher at 47%. This shows that the combination has a positive synergetic effect on bio-crude formation.

TABLE 2

Bio-crude yields (organic basis, dry-ash-free) and product distribution from HTL of individual components and combined filter cakes.

| | Bio-crude (%) daf (%) | ± | Bio-crude (%) db(%) | ± | Gas db(%) | ± | Solid db(%) | ± | Water db(%) |
|---|---|---|---|---|---|---|---|---|---|
| with K₂CO₃ | | | | | | | | | |
| Sludge | 37.0 | 1.5 | 30.7 | 1.2 | 9.7 | 1.3 | 19.5 | 0.2 | 40.1 |
| *Miscanthus* | 26.0 | 1.6 | 24.1 | 1.4 | 22.8 | 0.2 | 8.5 | 0.4 | 44.6 |
| Switchgrass | 28.0 | NA | 22.1 | NA | 22.1 | NA | 14.7 | NA | 41.1 |
| Willow | 28.3 | 1.7 | 26.0 | 1.5 | 23.0 | 2.9 | 12.5 | 1.3 | 38.5 |
| Pine Flakes | 25.7 | 2.2 | 23.6 | 2.0 | 25.2 | 1.8 | 8.4 | 0.5 | 42.8 |
| Pine Saw Dust | 22.8 | 0.9 | 20.8 | 0.8 | 39.9 | 6.7 | 9.2 | 0.9 | 30.1 |
| No catalyst | | | | | | | | | |
| Sludge | 42.6 | 0.7 | 35.4 | 0.6 | 16.2 | 2.5 | 19.6 | 0.1 | 28.8 |
| *Miscanthus* | 22.8 | 1.7 | 21.2 | 1.6 | 12.5 | 0.5 | 17.9 | 2.3 | 48.4 |
| Switchgrass | 29.1 | 1.2 | 26.5 | 1.2 | 13.0 | 3.5 | 14.2 | 0.7 | 46.3 |
| Willow | 25.9 | 4.2 | 25.1 | 4.0 | 17.1 | NA | 21.9 | 0.7 | 35.9 |
| Pine Flakes | 31.1 | 0.2 | 28.6 | 0.2 | 13.5 | 2.1 | 19.9 | 0.5 | 38.0 |
| Sludge co-lique-faction | | | | | | | | | |
| *Miscanthus* Ext. | 47.1 | 0.4 | 41.8 | 0.3 | 22.9 | 6.4 | 17.5 | 1.0 | 17.8 |
| Willow Ext. | 41.0 | 1.4 | 35.6 | 1.2 | 25.9 | 6.5 | 25.8 | 9.9 | 12.6 |
| Switchgrass Ext. | 41.0 | 0.1 | 35.1 | 0.1 | 22.1 | 5.0 | 18.0 | 0.2 | 24.9 |
| Pine Flakes | 45.0 | 1.7 | 39.4 | 1.5 | 20.2 | 3.1 | 20.3 | 0.3 | 20.2 |
| Pine Saw Dust | 43.2 | 0.6 | 37.6 | 0.5 | 17.2 | 1.1 | 20.3 | 0.2 | 24.9 |
| *Miscanthus* ground | 40.8 | 5.0 | 35.7 | 4.3 | 15.7 | 5.0 | 18.0 | 0.3 | 30.7 |

* NA = not available

The invention claimed is:

1. A method of wastewater treatment comprising the steps of;
providing a filter aid prepared by extrusion of lignocellulosic feedstocks harvested within three weeks before use as a filter aid or by extrusion of wet lignocellulosic feedstocks having dry matter content 30-75% (w/w);
using the filter aid to collect particulate matter from an aqueous stream and thereby obtain a spent filter aid; and
using the spent filter aid with collected particulate matter as a substrate for thermo-chemical conversion
wherein the aqueous stream is a suspension of algae, bacteria or yeast or a wastewater stream selected from the group consisting of municipal, domestic and/or industrial sewage wastewater, grey water, storm water and industrial wastewaters from breweries, dairies, abattoirs, chemical manufacturing industry, petroleum/gas fracking, mineral processing and mining industry.

2. The method of claim 1 wherein the spent filter aid with collected particulate matter has a dry matter content in the range 13-30% w/w.

3. The method of claim 1 wherein the filter aid comprises at least 30% (w/w) extruded lignocellulosic plant material having a particle size in the range 0.2 mm to 5 mm.

4. The method of claim 1 wherein no drying and/or de-watering step is performed with the spent filter aid with collected particulate matter prior to its use as a substrate for thermo-chemical conversion.

5. The method of claim 1 wherein the filter aid is used to collect particulate matter in an appropriate mass ratio such that the spent filter aid with collected particulate matter has between 10% and 80% of its solids content provided by the filter aid and between 90% and 20% of its solids content provided by the collected particulate matter.

6. The method of claim 1 wherein the spent filter aid with collected particulate matter has a dry matter content (w/w) within the range 13-30%.

7. The method of claim 1 wherein the particulate matter is sewage sludge collected from sewage wastewater.

8. The method of claim 7 wherein the substrate for thermo-chemical conversion exhibits positive synergies in hydrothermal liquefaction such that greater oil yields are obtained than could be obtained from sewage sludge and extruded biomass separately.

9. The method of claim 1 wherein the filter aid is fluffy in consistency and has <1% w/w of hard particles.

10. The method of claim 1 wherein extrusion is conducted using a twin screw extruder.

11. The method of claim 1 wherein the filter aid is mixed with the aqueous stream to be treated prior to its use in collecting particulate matter.

12. The method of claim 1 wherein the thermo-chemical conversion is hydrothermal liquefaction.

13. The method of claim 1 wherein the lignocellulosic feedstock is miscanthus, willow or switchgrass.

14. A substrate for hydrothermal liquefaction comprising a filter aid prepared by extrusion of lignocellulosic feedstocks harvested within 3 days before use as a filter aid or by extrusion of wet lignocellulosic feedstock with dry matter content 30-75% (w/w) and particulate matter filtered from an aqueous stream using the filter aid in which between 10% and 80% of the substrate dry matter is provided by the filter aid and between 90% and 20% of the substrate dry matter is provided by the collected particulate matter.

15. A method of hydrothermal liquefaction of particulate matter comprising the steps of
providing a substrate for hydrothermal liquefaction according to claim 14, and
subjecting the substrate to hydrothermal liquefaction.

16. The method of claim 1, wherein the thermo-chemical conversion is selected from the group consisting of hydrothermal carbonization, hydrothermal liquefaction, thermal hydrolysis, combustion, solvothermal liquefaction, hydrothermal gasification, pyrolysis, and thermocatalytic reforming (TCR).

* * * * *